(No Model.)
P. C. VANN.
CULTIVATOR.
No. 498,867. Patented June 6, 1893.
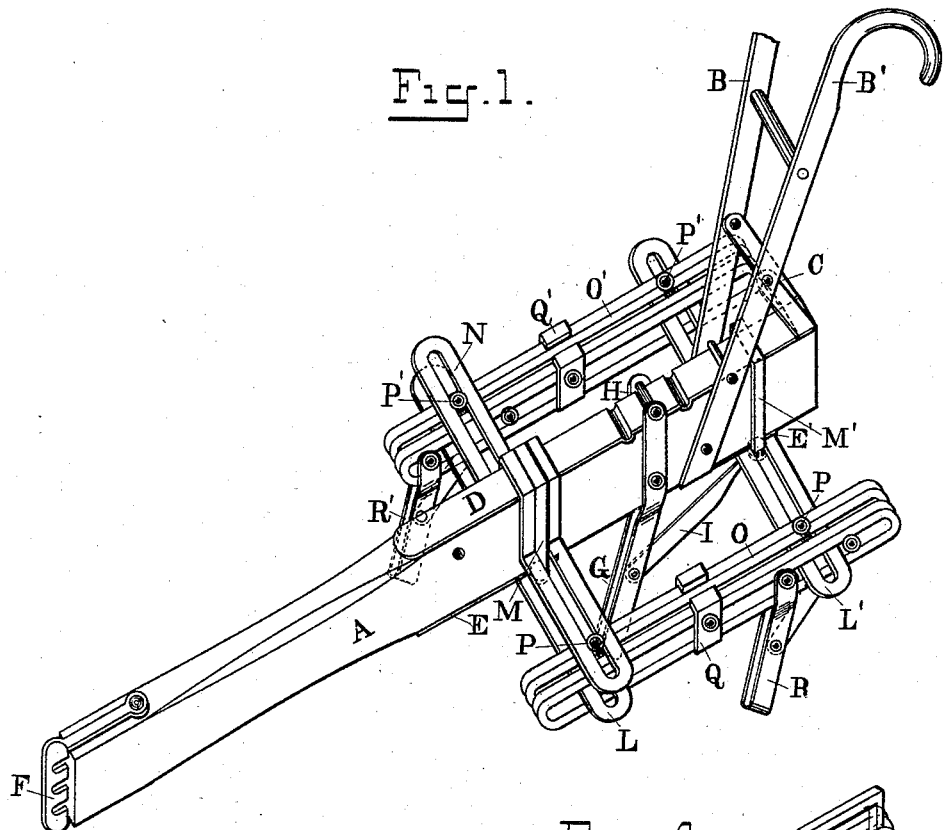
Fig. 1.
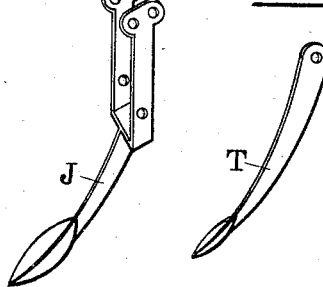
Fig. 2.
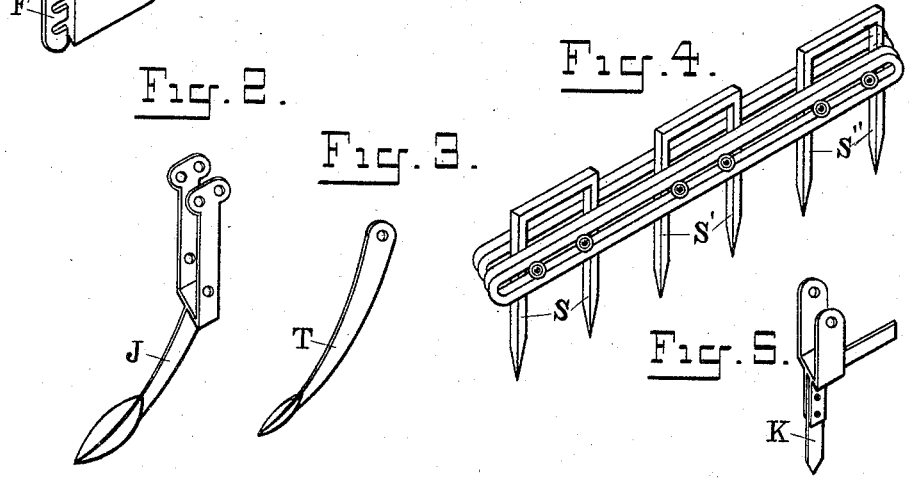
Fig. 3. Fig. 4.
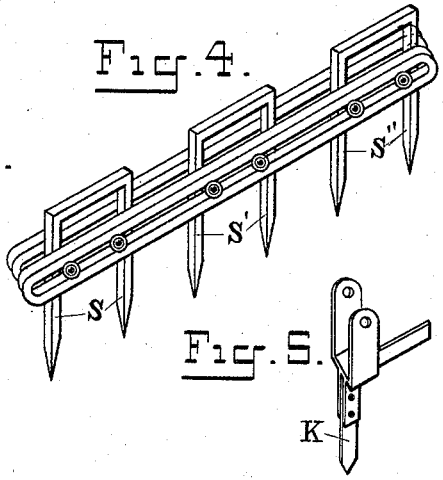
Fig. 5.
Witnesses
F. C. Alber
R. A. McAlvoy
Inventor
Perry C. Vann
By his Attorney P. Byrne
THE NORRIS PETERS CO., PHOTO-LITHO., WASHINGTON, D. C.

UNITED STATES PATENT OFFICE.

PERRY CLARK VANN, OF MORRIS, ALABAMA.

CULTIVATOR.

SPECIFICATION forming part of Letters Patent No. 498,867, dated June 6, 1893.

Application filed March 10, 1893. Serial No. 465,393. (No model.)

*To all whom it may concern:*

Be it known that I, PERRY CLARK VANN, a citizen of the United States, residing at Morris, in the county of Jefferson and State of Alabama, have invented certain new and useful Improvements in Cultivators; and I do hereby declare the following to be a full, clear, and exact description of the invention, such as will enable others skilled in the art to which it appertains to make and use the same.

My invention relates to improvements in that class of cultivators constructed and arranged, to interchange various kinds of plow points and implements, and the objects of my improvements are, first, to so construct an implement of that kind, that all the parts will be of a simple and cheaply made form, easily and cheaply put together, and can be manufactured at a low rate of cost; second, to provide an implement of this character, which will be capable of use as a single, double, or triple plow, a cultivator, a harrow, and all uses that an implement of that kind can be put to; third, to make a cultivator in which the cross bars and other parts, used to carry and secure the different plow points and implements, can be easily secured, or taken off the beam, that the cultivator when set up can be arranged to straddle, or to pass between the rows as may be desired, and will be perfectly adjustable in all its parts. I attain these objects in the novel arrangement, construction and combination of parts, illustrated in the accompanying drawings, in which—

Figure 1, is a perspective view of my cultivator, with cross bars and side bars attached. Fig. 2, is a perspective view of a bull tongue point. Fig. 3, is a cultivator point, to clamp in the side bars. Fig. 4, is one of the side bars, showing the method of securing harrow teeth in the side bar. Fig. 5, is a drill opener, or single harrow tooth, to place on the forward part of the beam.

Similar letters refer to similar parts throughout the several views.

The plow beam A, is made of wood in the usual manner, and is provided with the usual handles B. B' secured to the beam by bolts, the said handles are also provided with an iron brace C, secured by rivets to the handles, and to the back end of the beam; the beam A, is further provided with an iron plate D on the upper side, and two short plates E, E' on the under side, the said plates having the back end slightly turned down at right angles, to prevent the cross bars from slipping back, the front end of the beam is provided with a clevis F, made in any of the usual forms.

To use the cultivator as a single plow, the beam A is provided with a plow foot G, secured to the beam by a bolt H resting in one of the recesses formed in the beam plate D, the said foot having a brace I, pivoted at one end in the foot and secured at the other end by a bolt underneath the cross bar K'; the said foot can be fitted with any of the usual plow points generally used for that purpose.

If so desired the beam A can be fitted with the bull tongue J, Fig. 2, in place of the foot, it being secured to the beam by one bolt passing through the beam, the upper bolt resting in the recess formed in the beam plate, two or more holes being provided in the upper end, for the adjustment of the angle, that the bull tongue stands to the beam; the drill opener, or single harrow tooth K, Fig. 5, can also be placed on the front part of the beam A when needed, and is secured to the beam, by a bolt passing over the beam, clamping the sides of the drill opener securely to the beam.

Underneath the beam A, are placed two cross bars L. L', they are made of wrought iron, or steel, in the form of an oblong link, and are secured to the beam by stirrups M, M' having washers and nuts on their lower ends; the front end is provided with an additional cross bar N, made in the same manner of the form of an oblong link, and formed in the center to rest on the beam and fit down on both sides.

The side bars O, O' are made of wrought iron, or steel, in the form of oblong links, two links on a side, forming one side bar, they are placed on the cross bars and secured by clamping bolts P, P', and are also provided with side clamps Q, Q' on the sides; to the side bars O, O' can be attached the plow feet R, R' secured by bolts as shown, the pivoted brace on each foot allowing it to be set at any angle desired, the harrow teeth S, S' S'', are secured in the side bars by placing them between the links, and clamping with a series of bolts as shown in Fig. 4, which permits them to be adjusted up or down as may be desired. The cultivator teeth T, are secured in the side bars, by a bolt through the head of each one, clamping it firmly between the side bars.

The operation and advantages of my improved implement, will be readily understood by one versed in the art to which it appertains.

When it is desired to use the implement as a single plow, or bull tongue, it is stripped of the cross and side bars, and when used as a cultivator, harrow, as a double or triple plow, the cross and side bars are attached; when the cross and side bars are on, all plow points and implements generally used can be readily attached, and as obvious to be seen, the side bars can be adjusted in, or out, or at any angle that may be desired.

Having thus described my invention, what I claim as new, and desire to secure by Letters Patent, is—

A cultivator as shown and described, consisting of a beam having handles, secured to the beam with bolts and a brace, a plow foot removably attached to the beam, two cross bars of the form of oblong links, removably attached to the under side of the beam by stirrups resting on the top, a third removable cross bar of the form of an oblong link, formed to rest on the beam, two adjustable side bars, of the form of oblong links, two links to each side bar, placed upon the cross bars, the side and cross bars secured and clamped together by bolts, the side bars being provided with side clamps to clamp them sidewise, the said side bars having detachable plow feet, secured to them by bolts, all combined as shown and for the purpose set forth.

In testimony whereof I affix my signature in presence of two witnesses.

PERRY CLARK VANN.

Witnesses:
J. W. TAYLOR,
W. E. MEREDITH.